United States Patent [19]

Caron et al.

[11] Patent Number: 5,311,614
[45] Date of Patent: May 10, 1994

[54] SINGLE MODE FIBER OPTIC VARIABLE ATTENUATOR WITH SUPPORTED OPTICAL FIBER

[75] Inventors: Bernard G. Caron, Harrisburg; Warren H. Lewis, Elizabethtown; Gregory B. Powers, Shermansdale; John C. Hoffer, Harrisburg, all of Pa.

[73] Assignee: The Whitaker Corporation, Wilmington, Del.

[21] Appl. No.: 996,753

[22] Filed: Dec. 24, 1992

Related U.S. Application Data

[63] Continuation-in-part of Ser. No. 860,939, Mar. 31, 1992, abandoned.

[51] Int. Cl.$^5$ ............................................. G02B 6/00
[52] U.S. Cl. ................................... 385/140; 385/48
[58] Field of Search .................. 385/27, 28, 29, 140, 385/48

[56] References Cited

U.S. PATENT DOCUMENTS

| | | | |
|---|---|---|---|
| 4,364,639 | 12/1982 | Sinclair et al. | 385/16 |
| 4,449,210 | 5/1984 | Myer | 367/149 |
| 4,516,827 | 5/1985 | Lance et al. | 385/140 |
| 4,519,671 | 5/1985 | Curtis et al. | 385/140 |
| 4,529,262 | 7/1985 | Ashkin et al. | 385/140 |
| 4,591,786 | 5/1986 | Koo et al. | 324/244.1 |
| 4,645,294 | 2/1987 | Oguey et al. | 385/140 |
| 4,721,351 | 1/1988 | Goepfert et al. | 385/140 |
| 4,747,652 | 5/1988 | Campbell et al. | 385/48 |
| 4,759,605 | 7/1988 | Shen et al. | 385/48 |
| 4,822,125 | 4/1989 | Beals et al. | 385/140 |
| 4,850,670 | 7/1989 | Mathis et al. | 385/68 |
| 4,904,044 | 2/1990 | Tamulevich | 385/56 |
| 4,952,798 | 8/1990 | Graham et al. | 250/227.11 |
| 4,979,793 | 12/1990 | Bowen et al. | 385/140 |
| 4,982,083 | 1/1991 | Graham et al. | 250/227.11 |
| 4,989,938 | 2/1991 | Tamulevich | 385/33 |
| 5,029,962 | 7/1991 | Uken et al. | 385/48 |

FOREIGN PATENT DOCUMENTS

| | | |
|---|---|---|
| 0332900 | 9/1989 | European Pat. Off. . |
| 2667697 | 4/1992 | European Pat. Off. . |

Primary Examiner—Frank Gonzalez
Attorney, Agent, or Firm—Driscoll A. Nina, Jr.

[57] ABSTRACT

A continuously variable fiber optic attenuator 10, particularly for attenuating single mode fibers, has means 20 for supporting a section 25 of an optical fiber 24 substantially along the length of the section 25 and means 22 for bending at least a portion of the supported optical fiber section 25 in a controlled manner for attenuating light passing through the optical fiber 24. Preferably, the support means 20 comprises a deformable support means such as a spring 15 or an elastomeric body 71 for supporting the optical fiber 24 as it is bent. Most preferably, the deformable support means supports a section 25 of optical fiber 24 formed in one or more loops around the deformable support means, and the bending means is a plunger 22 movable to an extended position pressing against the support means 20 to bend portions of the loops of optical fiber 24 in a controlled manner. The fiber optic attenuator 10 of the present invention provides accurate control over the amount of attenuation of the light passing through the fiber 24 without damaging the optical fiber 24 or the signal passing therethrough.

16 Claims, 8 Drawing Sheets

SINGLE MODE FIBER OPTIC VARIABLE ATTENUATOR WITH SUPPORTED OPTICAL FIBER

This application is a continuation-in-part of Caron et al. co-pending U.S. application Ser. No. 07/860,939 filed Mar. 31, 1992 (now abandoned).

FIELD OF THE INVENTION

This invention is directed to optical fiber transmission systems and more particularly to variable attenuators used in same.

BACKGROUND OF THE INVENTION

The use of optical fibers in signal transmission systems has prompted the use of optical fiber attenuators that allow high-powered transmission signals to be processed directly into fiber optic receivers. Fiber optic receivers are incapable of processing incoming optical signals if those signals have a power level that is too large. The maximum acceptable power level is a property of each receiver and is known as the upper limit of that receiver's dynamic range. Because the optical loss of fiber optic systems may vary, provisions must be made to allow the optical power level delivered to the receiver to be modified.

Fiber optic attenuators are devices which reduce the amount of power present in an optical signal. Fiber optic variable attenuators are fiber optic attenuators in which the amount of this reduction may be adjusted.

In the past, fiber optic variable attenuators have involved, for example, the use of lenses and variable neutral density optical filters (e.g. as described in U.S. Pat. No. 4,989,938), the variation of the relative orientation the ends of two fibers (e.g. as described in U.S. Pat. Nos. 4,645,294 and 4,519,671), and movement of a reflective surface, thereby effecting change of the coupling between two fibers (e.g. as described in U.S. Pat. No. 4,516,827).

These techniques are labor intensive, especially when applied to singlemode fibers, in that very precise alignment of the two fibers is necessary to ensure a low loss when the device has been adjusted to provide a minimum of attenuation. In addition, costly optical components, such as lenses and filters, are used in the construction of the majority of currently available variable fiber optic attenuators. In general, many prior art devices are expensive and complex, imprecise in control, and susceptible to external shocks and vibrations.

SUMMARY OF THE INVENTION

The present invention provides a continuously variable fiber optic attenuator, especially for single mode optical fibers, which overcomes the inadequacies of prior art devices and which provides precise control over the amount of attenuation with a simple, cost effective device.

A fiber optic attenuator of the present invention comprises means for supporting a section of an optical fiber substantially along the length of the section, and means for bending at least a portion of the supported optical fiber section in a controlled manner to attenuate light passing through the optical fiber. With the present invention, by bending the optical fiber in a precisely controlled manner, such that the radius is less than a predetermined critical value for the selected waveguide, the waveguide is, in effect, caused to fail and to leak light out of the fiber core in a controlled manner so as to attenuate the light passing therethrough without damaging the fiber or the signal carried thereby in any way.

In accordance with a presently preferred embodiment, the support means comprises a deformable support means such as a flexible steel spring or an elastomeric body which deforms to maintain support of the optical fiber section when it is bent. The section of supported optical fiber preferably comprises one or more loops of optical fiber wound around the support means; and the support means preferably also includes a steel tape or the like wrapped around the spring or elastomeric body to which the optical fiber loops are bonded to prevent the loops from shifting or sliding while they are being bent.

The bending means preferably comprises a plunger which is movable between a retracted position away from the deformable support means and an extended position pressing against the support means to deform the support means and bend the optical fiber loops thereon. The plunger preferably has a generally rounded end for bending the optical fiber loops at three locations in a manner that maintains the radii of the bends constant such that the amount of attenuation depends only on the length of the bent portions of the optical fiber. This prevents the introduction of undesirable optical effects that may result from varying the radii of the bends.

In a presently further preferred embodiment of the invention, the above preferred embodiment is further modified to reduce "creep" of the attenuator and to improve the monotonicity of the attenuation versus actuation (plunger depth) curve. "Creep" is defined as variation in attenuation over time.

The presently further preferred embodiment comprises a deformable support means such as a flexible spring, having a generally horseshoe-shape, with ends that terminate in an essentially tangential manner into respective posts. The supported optical fiber section comprises one or more loops of optical fiber wound around the horseshoe-shaped flexible spring and across the opening defined by the two posts in which the ends of the spring terminate.

The bending means comprises a plunger which is movable between a retracted position away from the optical fiber and an extended position pressing against the optical fiber passing across the opening defined by the two posts. The plunger has a generally rounded end where it contacts the optical fiber. When in an extended position, the pressure on the section of optical fiber deforms the support means, which remains in a supporting relationship with the section of optical fiber, and bends the fiber around three constant radius locations—each of the two posts and the generally rounded end of the plunger. These three radii are smaller than the critical radius for the optical fiber resulting in light leaking out of the optical fiber thereby attenuating the signal.

Locking means may also be provided for locking the plunger in a desired extended position.

The optical fiber attenuator of the present invention is simple in construction and cost effective to manufacture, and provides precise control over the amount of attenuation. Further advantages and specific details of the invention will become apparent hereinafter in conjunction with the following detailed description of presently preferred embodiments.

DETAILED DESCRIPTION OF THE PREFERRED EMBODIMENTS

Figure 1:
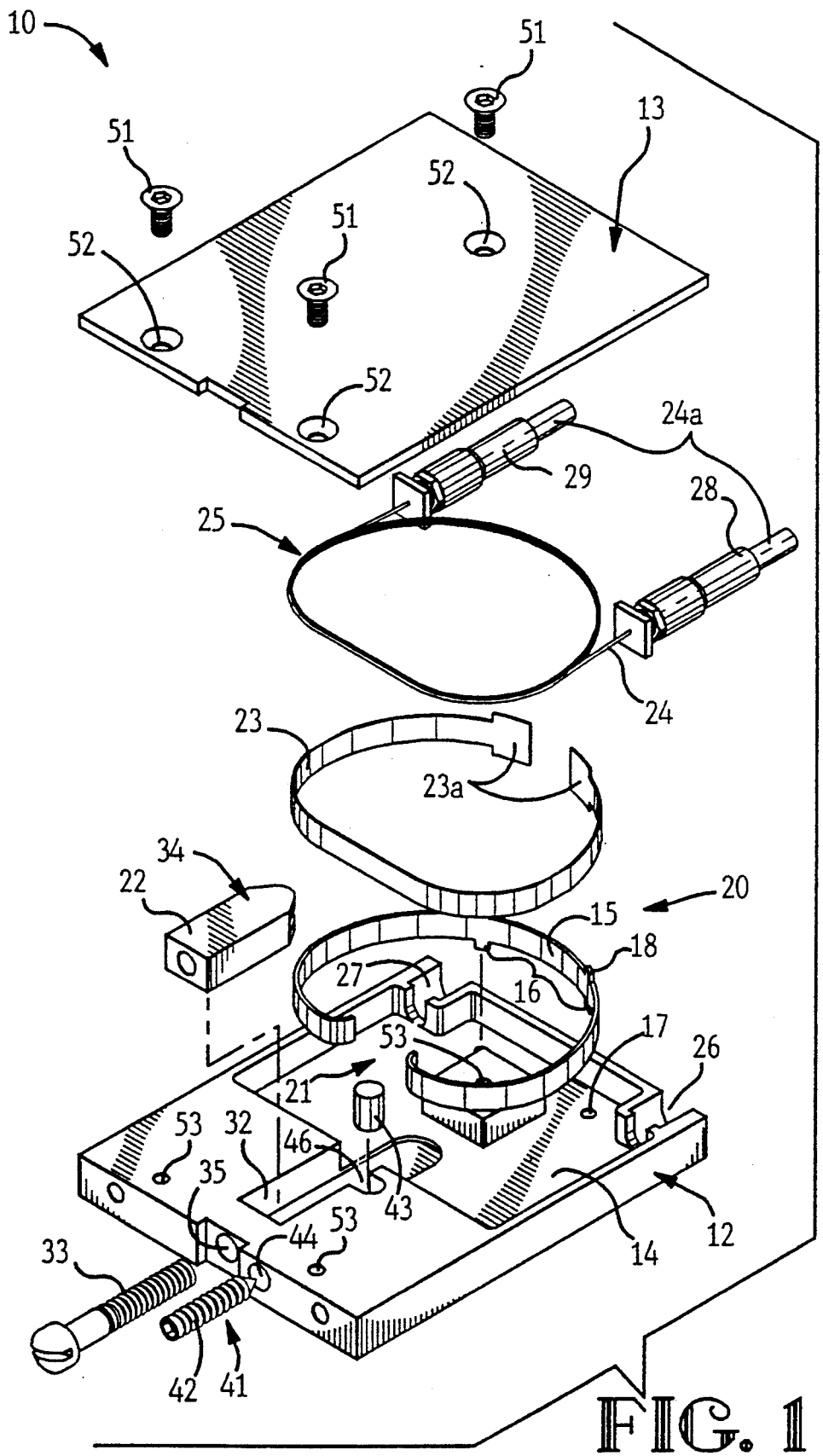
FIG. 1 is an exploded, perspective view of a fiber optic attenuator according to a presently preferred embodiment of the invention.
Figure 2:
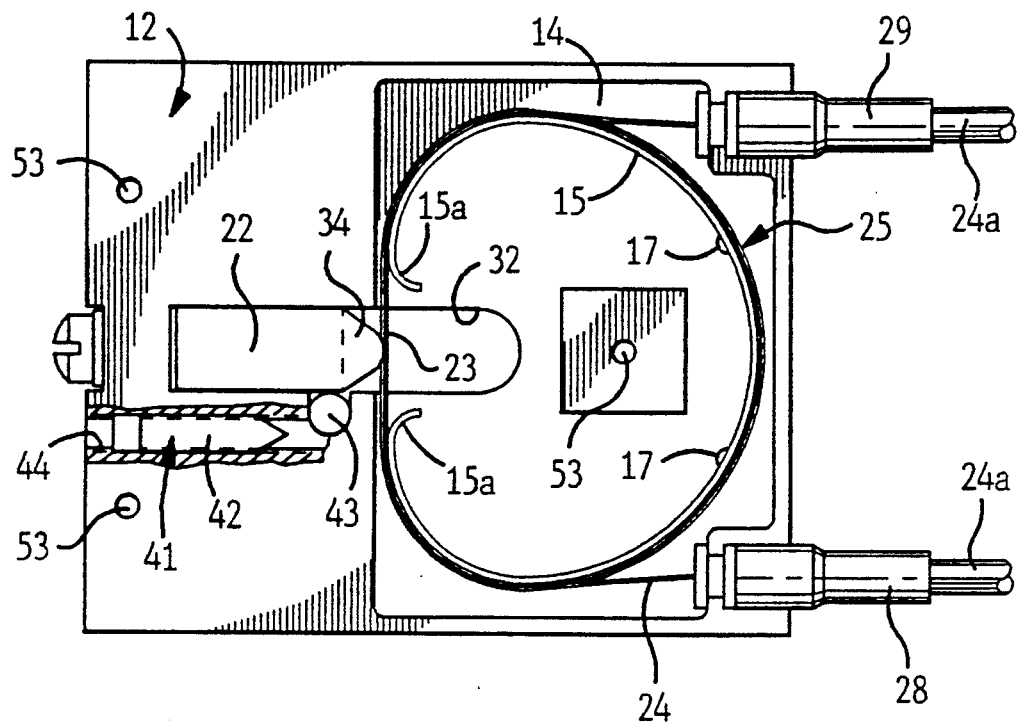
FIG. 2 and 3 are top views of the fiber optic attenuator of FIG. 1 with the cover removed to illustrate the operation of the device.
Figure 3:
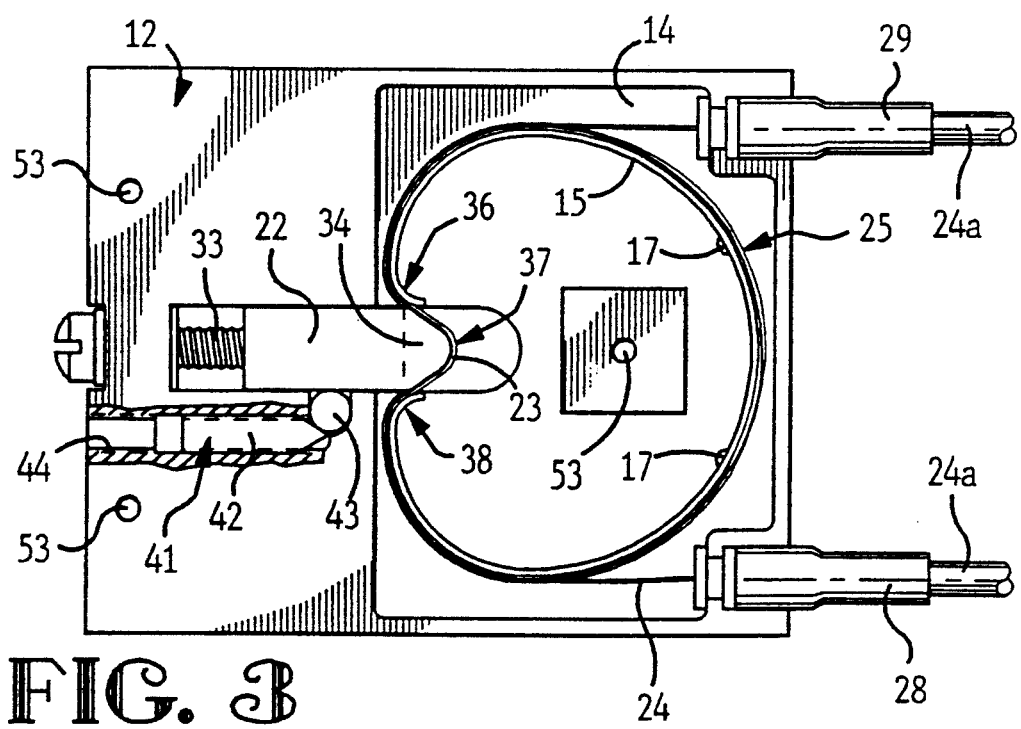
Figure 4:
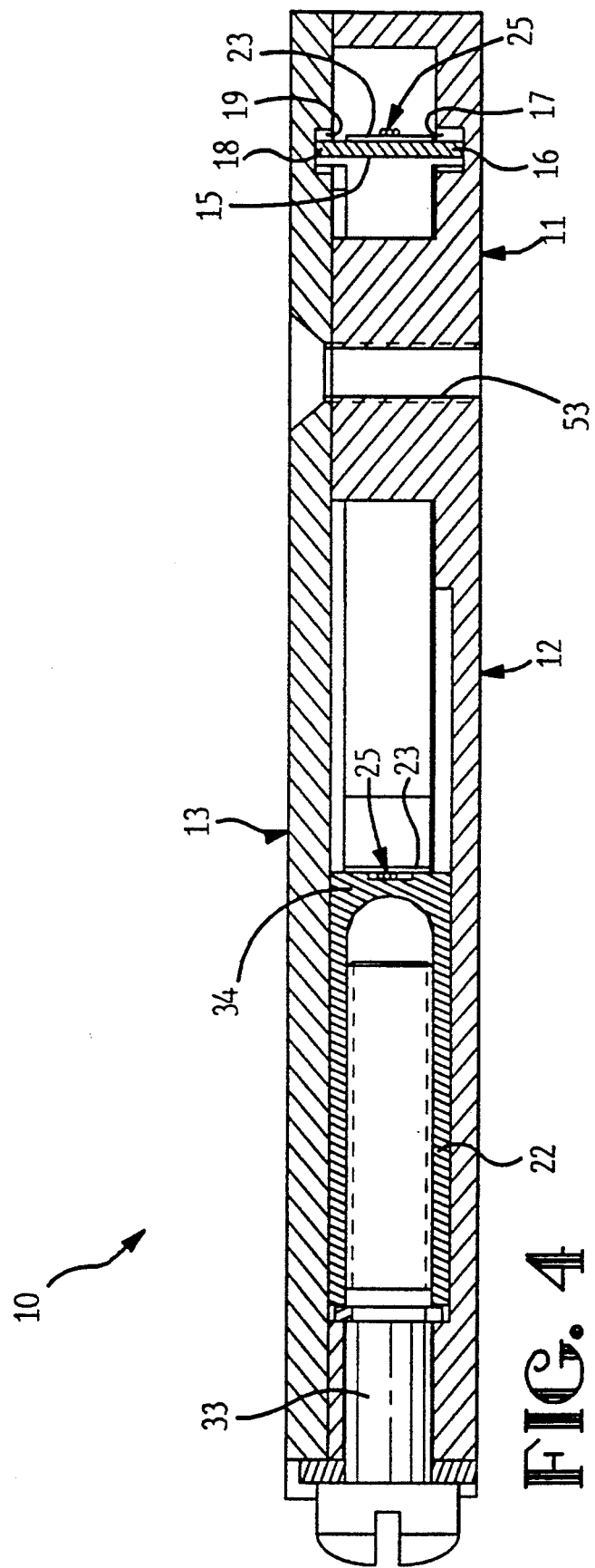
FIG. 4 s a cross-sectional side view of the fiber optic attenuator of FIG. 1.

FIGS. 1-4 illustrate a continuously variable fiber optic attenuator in accordance with a presently preferred embodiment of the invention. The attenuator is generally designated by reference number 10 and includes a housing 11 of generally rectangular shape having a housing body 12 and a cover 13. The housing 11 may be made from any of suitable materials, such as metals, plastics, and ceramics. Housing body 12 comprises a one-piece body and includes a generally rectangular-shaped cavity 14 for receiving an optical fiber to be attenuated. More particularly, cavity 14 contains a support means 20 for supporting a section 25 of an optical fiber 24, such as a single-mode optical fiber, to be attenuated, which support means comprises a deformable support means including a generally horseshoe-shaped spring 15 having a thin steel tape 23 mounted around the outer surface thereof. Spring 15 comprises a flexible stainless steel spring having a width of approximately 0.125 inches and a thickness of approximately 0.02 inches, and is formed in a curved shape having a radius of about 0.70 inches. The spring includes a first pair of downwardly extending tabs 16 which are positioned to be inserted into a pair of slots 17 in the base 14 of the housing body 12 to fix the position of the spring 15 in cavity 14. A second pair of upwardly extending tabs 18 are positioned to be received within a pair of slots 19 in the cover 13 when the cover is attached to the housing body as shown in FIG. 4. The ends of the horseshoe-shaped spring are curved inwardly in a constant radius bend and are separated from one another to define a space or gap 21 therebetween. The thin steel tape 23 of, for example, 0.001 inch steel shim stock extends around the outer surface of the horseshoe-shaped spring 15 and is both mechanically attached to the spring by tabs 23a which are bent around the spring, and bonded to the outer surface thereof by a suitable adhesive. As best shown in FIGS. 2 and 3, the tape extends across the opening 21 defined between the ends of the spring.

The attenuator 10 is designed to attenuate an optical fiber 24 of a fiber optic cable 28a having a buffer coat surrounded by an exterior jacket 24a. For purposes of describing the invention, it is to be understood that the term "optical fiber 24" includes the buffer coating.

A section 25 of the optical fiber 24 to be attenuated, is wound around the outer surface of the steel tape 23 one or more times (three loops are shown in the Figs.). The optical fiber loops are also bonded to the surface of the steel tape by a silicone or acrylate adhesive or the like to prevent the optical fiber section from moving around on the support.

In order to allow light to be transmitted out of the buffer, the buffer coating preferably should be indexed matched to the adhesive or some other material adjacent the buffer, for example a gel or the like.

The housing body 12 also includes a pair of openings 26 and 27 in an end thereof which function as input and output openings for the optical fiber 24. The ends of the optical fiber jacket 24a are terminated at the openings by strain relief members 28 and 29, and the openings are configured to secure the strain relief members within the openings when the cover 13 is attached to the housing body 12. The strain relief members 28, 29 function to protect the optical fiber cable 24a from being bent sharply as the cable exits the attenuator housing body 12.

A plunger 22 is also supported in housing body 12 and extends within an elongated slot 32 therein. Plunger 22 is mounted to the end of a screw 33 which extends through a threaded opening 35 and an end of the housing body 12.

The end 34 of plunger 22 is of a generally rounded shape and is aligned with the opening 21 in spring 15, and is movable longitudinally toward and away from the support 20 by operation of the screw 33. FIG. 2 illustrates the plunger 22 in a retracted position away from support 20 and FIG. 3 shows the plunger in an extended position pushing against the support. As shown, when the plunger 22 is extended, it pushes against the steel tape portion of 23 extending across spring opening 21. The force of the plunger deforms the flexible spring 23 and causes the tape and the optical fiber loops carried thereon to be bent inwardly of the opening 21. In effect, the rounded end 34 of the plunger causes the loops of the optical fiber to be bent at three locations 36, 37 and 38 as shown in FIG. 3; and, at those locations, the fiber optic waveguide will, in effect, fail in a controlled manner and allow light to leak out thereby attenuating the light passing through the optical fiber.

Optical fibers may be bent without loss so long as the radii of those bends is larger than a critical value given by the parameters of the waveguide and the wavelength of the light being guided. On the other hand, when the fiber is bent in a radius which is less than this critical value, light is lost as the waveguide fails.

The amount of light lost is not, in general, a monotonic function of bend radius. Since it is important that the graph of loss vs actuation be a monotonic one, the radii of all bends tighter than the critical radius must stay constant as the device is actuated. This implies that the end 34 of plunger 22, as well as the loops 75 and 76 in spring 15, have bends of constant radius. The loss is then determined by the length of fiber bent to these radii. In this way, a monotonic function of loss vs actuation can be achieved.

As best shown in FIG. 4, the end 34 of plunger 22 is of U-shaped configuration so that the pushing force of the plunger will be applied primarily to the steel tape 23 on opposite sides of the optical fiber loops and not be applied directly against the optical fiber loops. Preferably, the recess in the plunger end may be made sufficiently shallow so that the recessed portion of the plunger end will just lightly contact the optical fiber loops when the plunger is extended. Then the plunger has been extended to the proper position to bend the optical fiber loops to obtain the desired amount of attenuation, the plunger is locked in position by a plunger locking mechanism 41 as shown in FIGS. 1–4. Plunger locking mechanism 41 comprises a locking screw 42 positioned in opening 44 parallel to opening 35, and a locking cylinder 43 in a lateral slot 46. As is apparent from FIGS. 3 and 4, by screwing the locking screw 42 into the housing body, the locking cylinder 43 is pushed laterally against the plunger by the tapered end of the screw to securely lock the plunger in place. Other plunger locking mechanisms could also be utilized, if desired.

After the assembly consisting of properly positioning the supported loops of optical fiber in the housing body 12, cover 13 is attached to the housing body 12 by means of screws 51 extended through holes 52 in the cover and screwed into aligned holes 53 in the housing base. As indicated above, when the cover is in place, slots 19 therein receive tabs 18 on the horseshoe-shaped spring to help retain the spring in position, and also assist in securing the optical fiber termination members 28 and 29 in position in openings 26 and 27.

With the present invention, an optical fiber section 25 comprising one or more loops of optical fiber are supported in such a manner that the section will not slide or shift around as it is bent in a controlled manner by plunger 22. This permits the device to provide precise control of the amount of attenuation in a simple, efficient manner.

Figure 5:
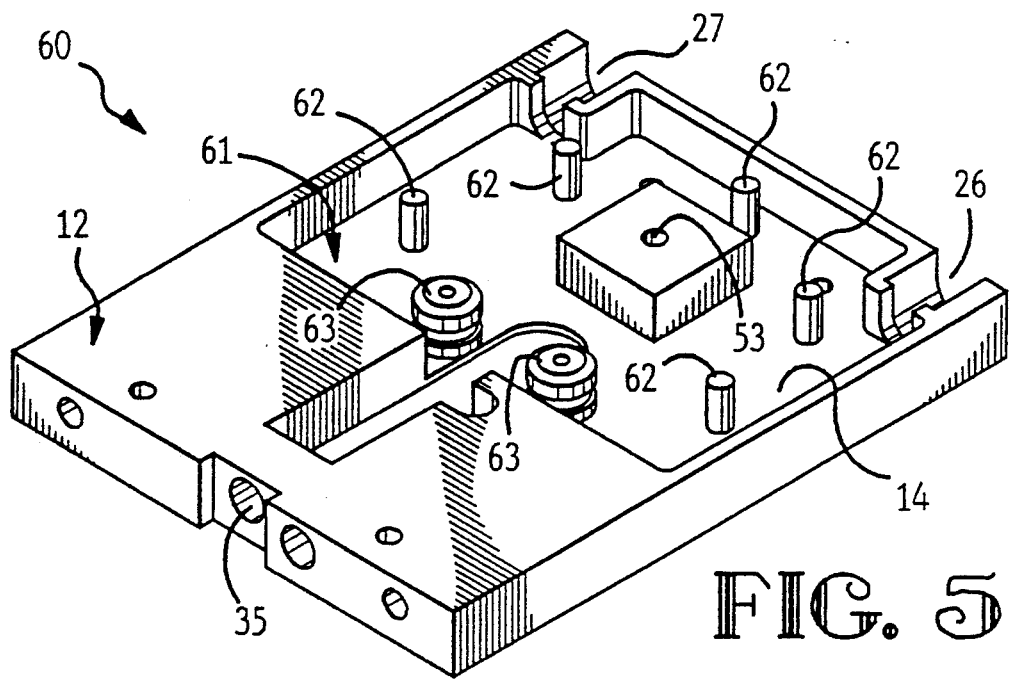
FIG. 5 is a perspective view, with cover removed, of a fiber optic attenuator according to a second preferred embodiment of the invention.
Figure 6:
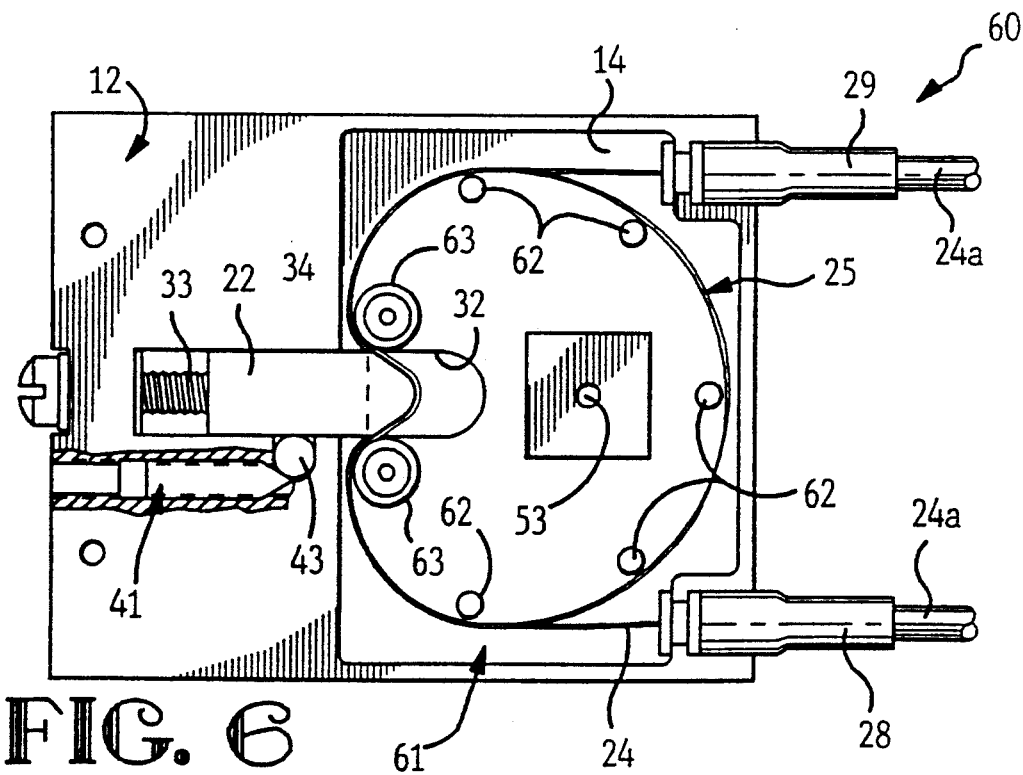
FIG. 6 is a top view of the fiber optic attenuator of FIG. 5.

It should also be noted that the radius of curvature of the optical fiber loops around the circumference of the spring is not, in itself, sufficient to cause attenuation of light passing through the fiber so that the amount of attenuation is controlled solely by bending the optical fiber with the plunger. FIGS. 5 and 6 illustrate a continuously variable fiber optic attenuator 60 (with cover removed) according to a second embodiment of the present invention. Attenuator 60 is similar to attenuator 10 of FIGS. 1–4 in many respects, and corresponding parts are identified by the same reference numbers. Attenuator 60 differs from the embodiment of FIGS. 1–4 in that the optical fiber support 20 has been replaced by a support 61 comprising a plurality of support pins 62 and a pair of bearing supports 63. One or more lops 25 of optical fiber 24 are extended around the support pins and bearings as shown in FIG. 6, and a controlled amount of bending of the optical fiber loops is introduced as in the previous embodiment by means of the plunger 22. The bearings 63 on either side of the plunger assist in preventing the optical fiber loops from slipping or sliding as they are bent by the plunger.

The bearings 63 may also be supported in the housing body to be movable, for example, against the bias of spring members or the like, as the optical fiber loops are bent to provide a deformable support for the optical fiber loops. Also, although not shown in FIGS. 5 and 6, the loops of optical fiber may be bonded to a loop of steel tape, as in the previous embodiment, which is extended around the pins and bearings to support the optical fiber loops as they are being bent.

Figure 7:
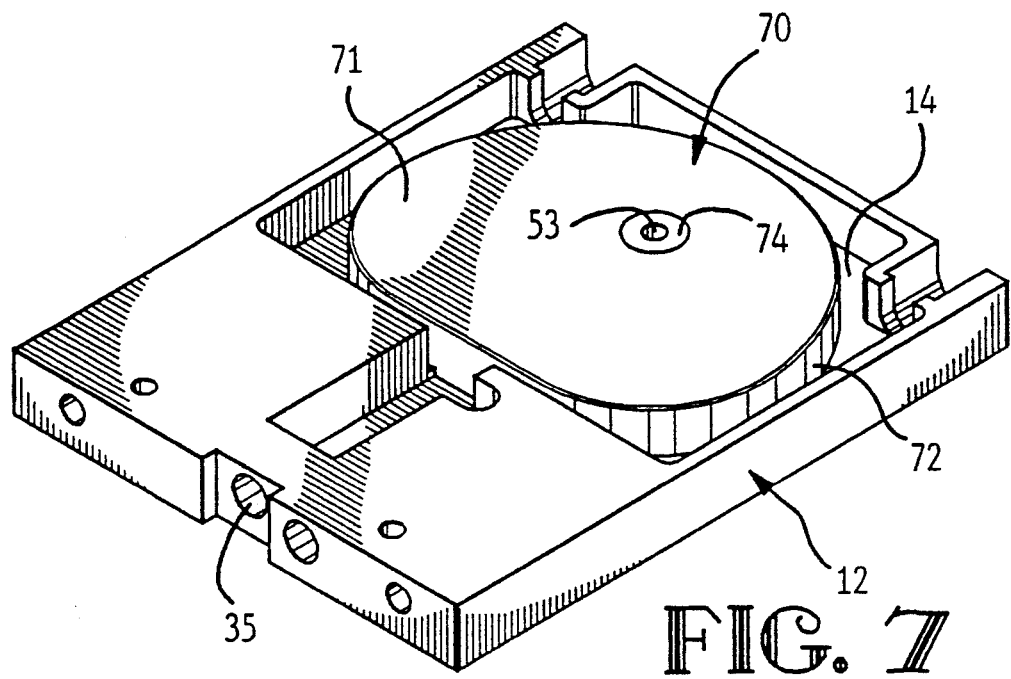
FIG. 7 is a perspective view, with cover removed, of a fiber optic attenuator according to a third preferred embodiment of the invention.
Figure 8:
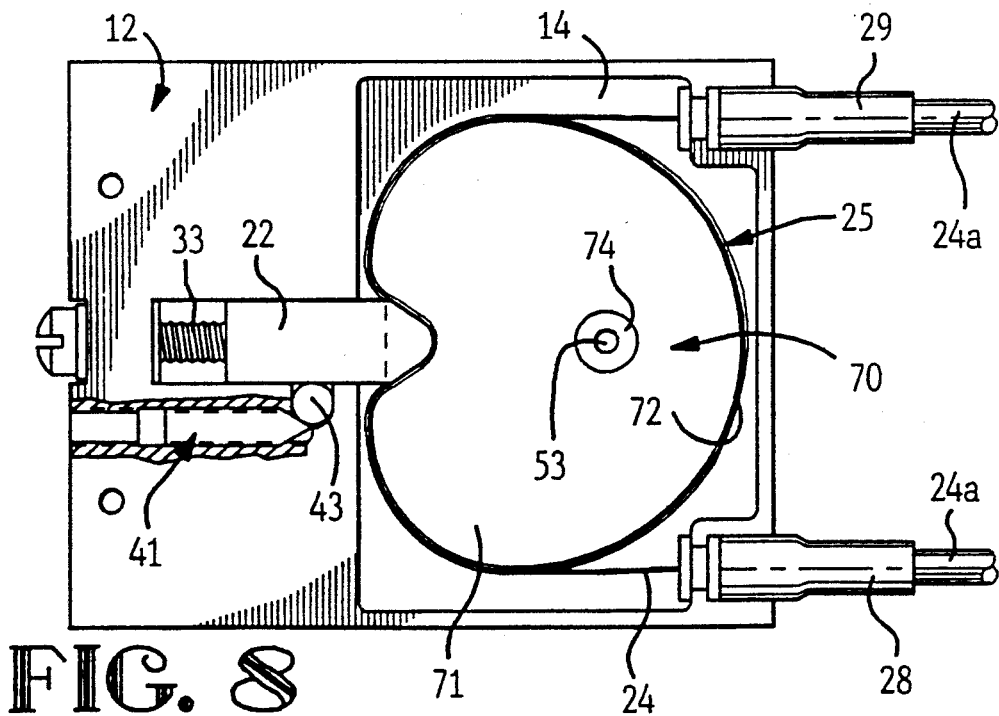
FIG. 8 is a top view of the fiber optic attenuator of FIG. 7.

FIGS. 7 and 8 illustrate a continuously variable fiber optic attenuator according to a third embodiment of the invention. In the embodiment of FIGS. 7 and 8, the optical fiber support 70 comprises a deformable elastomeric disk-shaped body 71 having a steel tape 72 mounted around the outer periphery thereof, and the loops 25 of optical fiber 24 are bonded to the outer surface of the tape as in the embodiment of FIGS. 1–4. The elastomeric body is secured in position within the housing by a suitable attachment member 74 as illustrated in the Figs. In the embodiment of FIGS. 7 and 8, when the plunger 22 is moved to an extended position, the elastomeric body 71 will deform as shown in FIG. 8 to continue to effectively support the loops as they are bent in a controlled manner to attenuate light passing therethrough.

Experimentation has shown that the presently preferred embodiment suffered from "creep"—variation in the amount of attenuation over time caused by the optical fiber 24 and its bond to the support means 20.

FIGS. 9–12 illustrate a continuously variable fiber optic attenuator in accordance with a presently further preferred embodiment of the invention. This further preferred embodiment is similar to the embodiment disclosed in FIGS. 1–4 with the exception of changes to minimize the "creep" and to assure constant radius bends at the ends of the spring.

The presently further preferred attenuator is generally designated by reference number 110 and includes a housing 111 of generally rectangular shape having a housing body 112 and a cover 113. The housing 111 may be made from any suitable material, such as metals, plastics and ceramics. The housing body 112 comprises a one-piece body and includes a generally rectangular-shaped cavity 114 for receiving an optical fiber to be attenuated.

More particularly, cavity 114 contains a support means 120 for supporting a section 125 of an optical fiber 124. The support means 120 comprises a deformable and generally horseshoe-shaped spring 115. The ends of the spring 115a are tangentially attached to respective posts 149,150 which are separated from one another to define a space or a gap 121 therebetween. The posts are free-floating within the housing on the ends of the spring 115 and have a radius less than critical value of the optical fiber.

It was discovered in the previous embodiment that the inwardly bent ends 15a of the spring 15 did not have a constant radius due to the difficulty in forming a constant radius bend in material that is adapted for use as a spring. The untoward result of the non-constant radius is the nonmonoticity of an attenuation versus actuation (plunger depth) curve. The separately formed posts 149,150 of this embodiment do not suffer from this problem.

Figure 12:
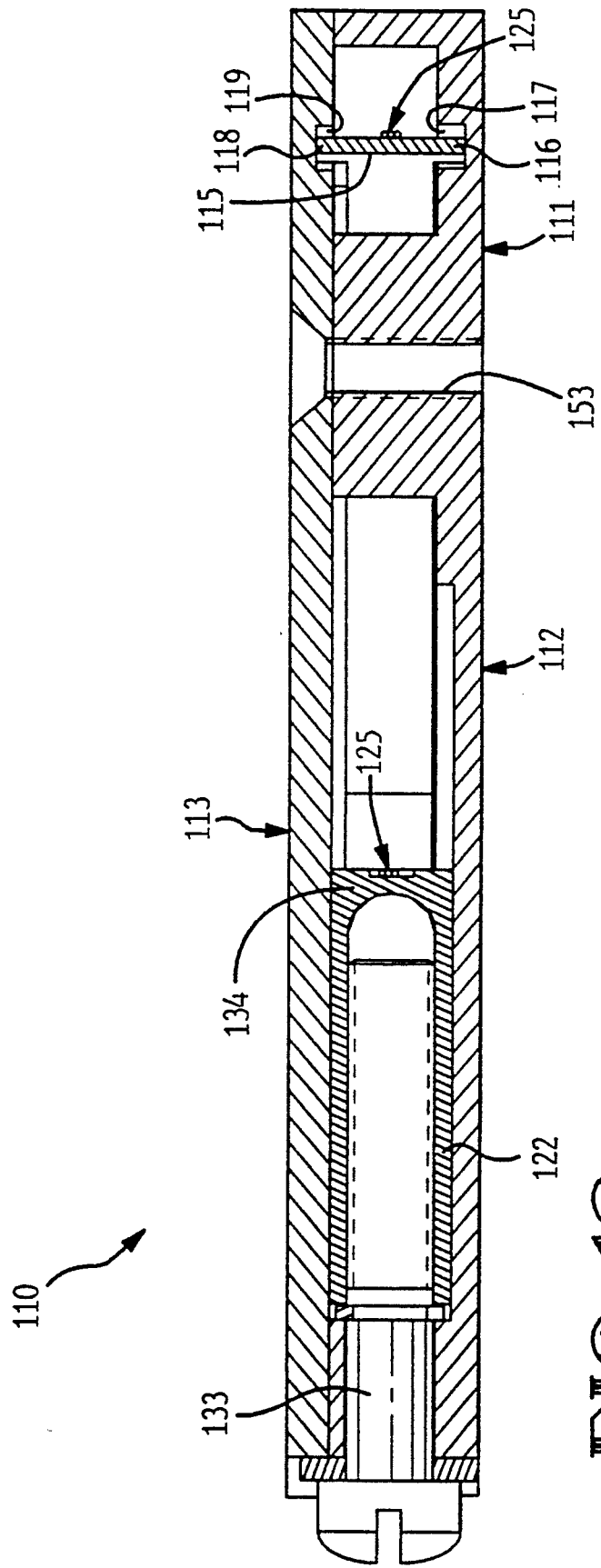
FIG. 12 is a cross-sectional side view of the fiber optic attenuator of FIG. 9.

In the present embodiment, the spring 115 is a flexible stainless steel spring similar to the one described in the above preferred embodiment. The radius of the major curved shape of the spring is larger than the critical value for the optical fiber so that no attenuation occurs when the fiber is looped around the spring 115. The spring includes a first pair of downwardly extending tabs 116 which are positioned to be inserted into a pair of slots 117 in the base 114 of the housing body to fix the position of the spring 115 in cavity 114. A second pair of upwardly extending tabs 118 are positioned to be inserted into a pair of slots 119 in the cover 113 when the cover is attached to the housing body 112 as shown in FIG. 12. The ends 115a of the springs being attached to the posts 149,150 by soldering, epoxy or any one of the numerous obvious methods. It is also envisioned that the spring could be molded from thermally stable plastic that would have the posts molded onto the ends.

The attenuator is designed to attenuate a signal present in an optical fiber 124 of a fiber optic cable having a buffer coat surrounded by an exterior jacket 124a. For the purpose of describing the invention, it is to be understood that the term "optical fiber 124" includes the buffer coating. A section 125 of the optical fiber 124 to be attenuated, is wound around the outer surface of the spring 115 and across the posts 149,150 spanning the gap 121 therebetween one or more times.

Experimentation showed that the creep was a product of the section of optical fiber looped around the spring 15. The optical fiber was deforming under the force of the plunger 22 and the support means 20. Over time the optical fiber within the buffer was migrating toward the inside of the bends because the buffer coat is considerably softer than the fiber. This resulted in the radius at which the optical fiber is bent changing over time thereby, inducing creep.

The presently preferred cable is a hermetic single mode fiber produced by SpecTran Corporation of Strurbridge, Mass. and sold under the Part No. SH108H. This cable has a 4.5 micron radius core, surrounded by 58 microns of cladding, surrounded by about 1 micron of a hermetic coating, encased in a 155 micron diameter polyimide buffer. The use of this fiber optic cable has made it possible to eliminate bonding the optical fibers to a steel tape around the spring.

The housing body 112 also includes a pair of openings 126 and 127 in an end thereof which functions as input and output openings for the optical fiber. The ends of the optical fiber jacket 124a are terminated at the openings by strain relief members 128 and 129, and the openings are configured to secure the strain relief members 128,129 within the openings when the cover 113 is attached to the housing body 112. The strain relief members 128, 129 function to protect the optical fiber cable 124a from being bent sharply just outside the attenuator housing body 112.

A plunger 122 is supported in the housing body 112 and extends within an elongated slot 132 therein. The plunger 122 is mounted to the end of a screw 133 which extends through a threaded opening 135 and an end of the housing body 112. The end 132 of the plunger 122 is of a generally rounded shape having a radius less than the critical value of the optical fiber and is aligned with the gap 121 between the posts 149,150 that are attached to the ends of the horseshoe-shaped spring 115.

Figure 10:
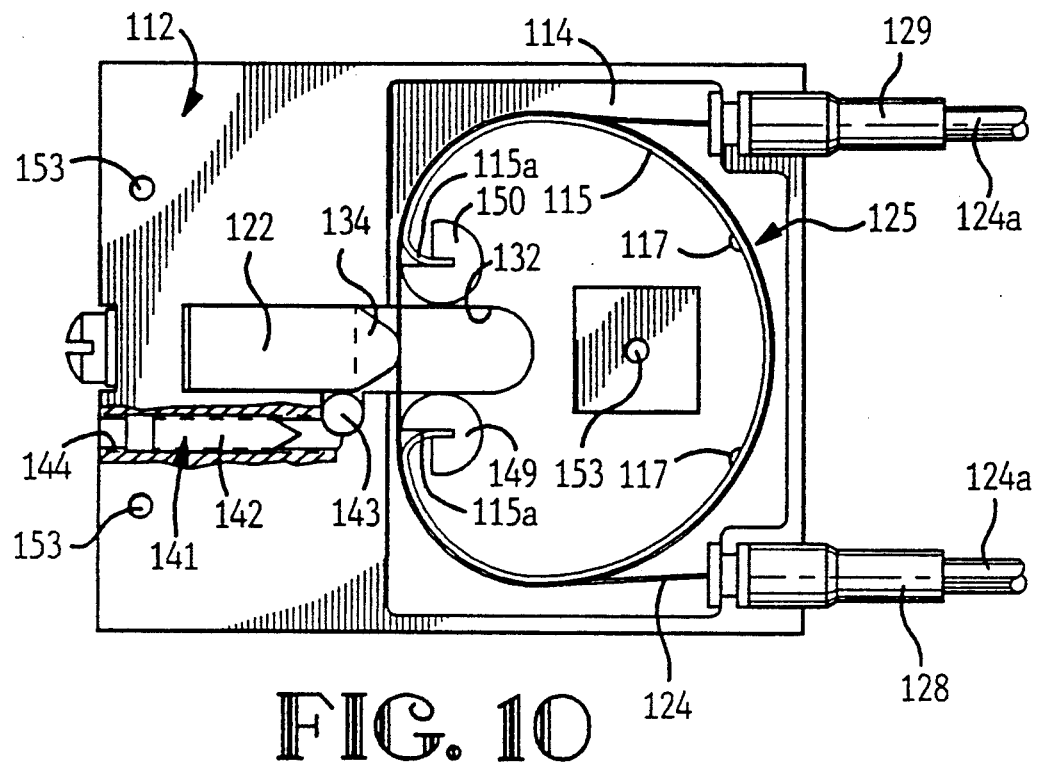
FIGS. 10 and 11 are top views of the fiber optic attenuator of FIG. 9 with the cover removed to illustrate operation of the device.
Figure 11:
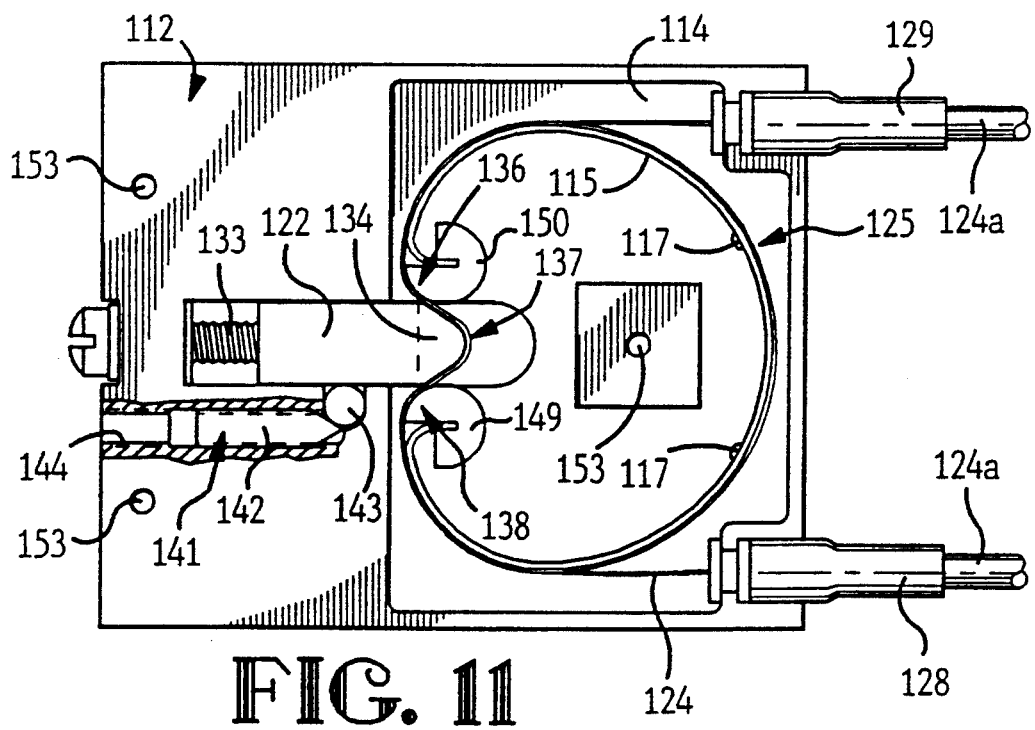

FIG. 10 shows the plunger 122 in a retracted position away from the optical fiber 124 and FIG. 11 shows the plunger 122 in an extended position against the optical fiber 124 where it passes across the gap 121 between the posts 149,150. The force of the plunger 122 against the optical fiber 124 causes the optical fiber 124 to be bent inwardly of the opening 121 about the two posts 149,150 thereby deforming the spring 115 which remains in a supporting relationship with the loops of optical fiber. In effect, the rounded end 134 of the plunger causes the loops of the optical fiber to bend at three locations 136,137,138—the end 134 of the plunger corresponding to 137 and at each of the two posts 149,150 corresponding to 136,138 as shown in FIG. 11.

Therefore, at these three locations, the waveguide properties of optical fiber 124 will fail in a controlled manner and allow light to leak from the fiber.

Figure 9:
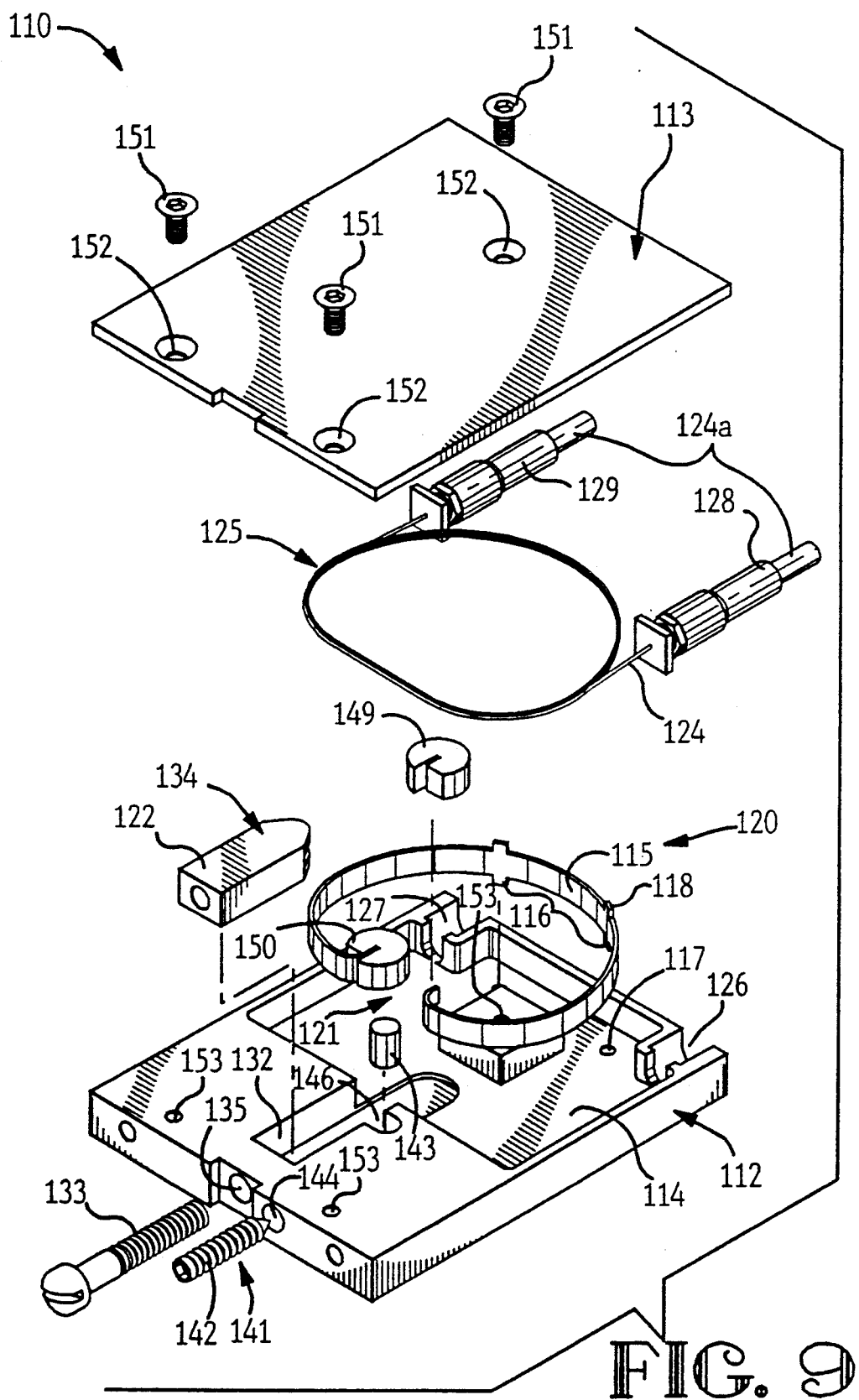
FIG. 9 is an exploded, perspective view of a fiber optic attenuator according to a presently further preferred embodiment of the invention.

When the plunger 122 is extended so that the desired degree of attenuation is achieved, the plunger may be locked in position by a plunger locking mechanism 141 as shown in FIGS. 9-11. By screwing the locking screw 142 into a threaded hole 144 in the housing body, the locking cylinder 143 is pushed laterally against the plunger to securely lock the plunger in place. It is envisioned that other locking mechanisms could be utilized or alternatively that a locking mechanism may not be required.

After assembly, consisting of properly positioning loops of optical fiber 124 around the support means 120 within the housing body 112 and attaching the cover 113 to the body by screws 151 passing thru holes 152 in the cover into threaded holes 153 in the body, the plunger 122 is extended until the desired amount of attenuation is achieved. As the plunger is being extended, the looped optical fibers are being bent about each post 150 and the end of the plunger 134. These three elements each have a constant radius that is less than he critical value for the optical fiber, thereby permitting the device to provide precise control of the amount of attenuation in a simple and efficient manner. While what has been described constitutes presently preferred embodiments of the invention, it should be recognized that the invention could take numerous other forms. Accordingly, it should be understood that the invention is to be limited only insofar as is required by the scope of the following claims.

We claim:

1. A fiber optic attenuator comprising:
   an optical fiber;
   a support member resiliently supporting a portion of the optical fiber thereupon in tension; and
   means for bending at least a portion of said optical fiber while supported by the resilient support member in a controlled manner to attenuate light passing through said optical fiber.

2. The fiber optic attenuator of claim 1, wherein said support member comprises a deformable resilient support member which deforms and, due to the resiliency of the support member, continues supporting said optical fiber section when said bending means bends said at least a portion of said supported optical fiber section.

3. The fiber optical attenuator of claim 2, wherein said deformable support member comprises a spring.

4. The fiber optic attenuator of claim 3, wherein the spring is metal.

5. The fiber optic attenuator of claim 3 wherein said spring comprises a generally horseshoe-shaped spring having constant radius inwardly-directed ends defining an opening therebetween and said supported optical fiber section comprises at least one loop of optical fiber wound around said spring, and wherein said bending means comprises a plunger movable between a retracted position away from said at least one loop of optical fiber and an extended position pressing against said at least one loop of optical fiber for bending said at least a portion of said at least one loop of optical fiber wound around said spring.

6. The fiber optic attenuator of claim 5 wherein said constant radius inwardly-directed ends are formed by incorporating posts at the ends of the horseshoe-shaped spring.

7. The fiber optic attenuator of claim 6 wherein the post is epoxied to the spring.

8. The fiber optic attenuator of claim 5 wherein said plunger has a generally rounded end for pressing against said loop of optical fiber at the opening of said spring, thereby bending the at least one loop of optical fiber across the constant radium inwardly-directed ends of the spring and said generally rounded end of the plunger.

9. The fiber optic attenuator of claim 5 wherein said at least one loop of optical fiber has a tape bonded thereto where said at least one loop spans the opening of the spring to prevent said at least one loop from slipping relative to the tape.

10. The fiber optic attenuator of claim 4 wherein said optical fiber includes a buffer coating indexed matched to an external material adjacent thereto to allow light to be transmitted out of the buffer.

11. The fiber optic attenuator of claim 2, wherein said means for bending is a plunger having a recess aligned with said supported optical fiber section for pressing against said deformable support member without pressing against said optical fiber section to any significant extent.

12. The fiber optic attenuator of claim 1, and further including locking means for locking said means for bending in position.

13. The fiber optic attenuator of claim 1, wherein said support member comprises a plurality of pins for supporting an optical fiber section.

14. The fiber optic attenuator of claim 2, wherein said deformable support means comprises a deformable elastomeric disk-shaped body.

15. A fiber optic attenuator comprising:
a deformable support for supporting at least one loop of an optical fiber therearound and means for deforming said deformable support and said at least one loop of optical fiber supported thereby in a controlled manner to attenuate light passing through said optical fiber.

16. A fiber optic attenuator comprising:
an optical fiber;
a support for supporting at least one loop of an optical fiber wound thereagainst; and
a mechanism for controllably bending said at least one loop of optical fiber to controllably attenuate light passing through said optical fiber.

* * * * *